(12) United States Patent
Zhan et al.

(10) Patent No.: US 9,989,931 B2
(45) Date of Patent: Jun. 5, 2018

(54) CHARGING ASSEMBLY FOR WRIST WATCH AND WRIST WATCH

(71) Applicant: JRD Communication Inc., Shenzhen (CN)

(72) Inventors: Wangfa Zhan, Shenzhen (CN); Jun Zhang, Shenzhen (CN); Xulin Cao, Shenzhen (CN)

(73) Assignee: JRD Communication Inc., Shenzhen, Guangdong (CN)

( * ) Notice: Subject to any disclaimer, the term of this patent is extended or adjusted under 35 U.S.C. 154(b) by 0 days. days.

(21) Appl. No.: 15/316,826

(22) PCT Filed: Apr. 13, 2016

(86) PCT No.: PCT/CN2016/079134
§ 371 (c)(1),
(2) Date: Dec. 6, 2016

(87) PCT Pub. No.: WO2017/008546
PCT Pub. Date: Jan. 19, 2017

(65) Prior Publication Data
US 2017/0205773 A1    Jul. 20, 2017

(30) Foreign Application Priority Data

Jul. 14, 2015 (CN) .......................... 2015 1 0413493

(51) Int. Cl.
*G04G 19/00* (2006.01)
*H01R 13/62* (2006.01)
(Continued)

(52) U.S. Cl.
CPC ............. *G04G 19/00* (2013.01); *H01R 13/60* (2013.01); *H01R 13/6205* (2013.01);
(Continued)

(58) Field of Classification Search
CPC ............................ G04G 19/00; H01R 13/6205
See application file for complete search history.

(56) References Cited

U.S. PATENT DOCUMENTS

| | | | | |
|---|---|---|---|---|
| 7,455,525 B2* | 11/2008 | Rambosek | ........... | H05K 5/0278 439/131 |
| 7,775,801 B2* | 8/2010 | Shiff | .................. | H01R 13/6205 439/39 |
| 2004/0081025 A1* | 4/2004 | Chen | .................. | G04B 37/1486 368/10 |

(Continued)

FOREIGN PATENT DOCUMENTS

| CN | 204232417 U | 4/2015 |
|---|---|---|
| CN | 105048548 A | 11/2015 |

(Continued)

*Primary Examiner* — Amy Cohen Johnson
*Assistant Examiner* — Daniel Wicklund
(74) *Attorney, Agent, or Firm* — Shimokaji & Associates, P.C.

(57) ABSTRACT

A wrist watch charging assembly is provided. The wrist watch charging assembly may include a charging cord, a charging port connector and a charging head that are electrically connected to two ends of the charging cord, and a mobile pin electrically connected to a circuit board inside the watch case, wherein the charging cord is fixed relative to the watch band, and the charging head is attached onto the watch case by means of magnetic adhesion to be in electrical contact with the mobile pin. A wrist watch that has an integrated wrist watch charging assembly is also provided. The end of the charging head for connecting the mobile pin is optionally snapped into a holding groove on the watch band, and the charging port for external connection is optionally snapped into a charging port cap on the watch band.

16 Claims, 2 Drawing Sheets

(51) Int. Cl.
  *H01R 13/60* (2006.01)
  *H01R 24/62* (2011.01)
  *H02J 7/00* (2006.01)
  *H01R 107/00* (2006.01)
  *H01R 13/24* (2006.01)

(52) U.S. Cl.
  CPC ............ *H01R 24/62* (2013.01); *H02J 7/0042* (2013.01); *H02J 7/0052* (2013.01); *H01R 13/24* (2013.01); *H01R 2107/00* (2013.01)

(56) References Cited

U.S. PATENT DOCUMENTS

| | | | | |
|---|---|---|---|---|
| 2006/0140055 | A1* | 6/2006 | Ehrsam | G04B 37/1486 368/10 |
| 2007/0091730 | A1* | 4/2007 | Ting | G04G 17/08 368/282 |
| 2007/0291453 | A1* | 12/2007 | Miller | H01R 13/65802 361/728 |
| 2013/0329532 | A1* | 12/2013 | Sorias | G04C 10/00 368/64 |
| 2014/0254083 | A1* | 9/2014 | Wang | G06F 1/1632 361/679.31 |
| 2015/0192903 | A1* | 7/2015 | Vondle | G04G 17/08 368/317 |
| 2015/0241911 | A1* | 8/2015 | Lim | G06F 1/163 361/679.03 |
| 2016/0291550 | A1* | 10/2016 | Chen | G04G 17/06 |
| 2016/0342176 | A1* | 11/2016 | Han | G06F 1/163 |
| 2016/0349708 | A1* | 12/2016 | Lee | G04B 37/1486 |

FOREIGN PATENT DOCUMENTS

| | | |
|---|---|---|
| CN | 105054506 A * | 11/2015 |
| DE | 19638953 A1 | 3/1998 |
| TW | M299876 U | 10/2006 |

\* cited by examiner

CHARGING ASSEMBLY FOR WRIST WATCH AND WRIST WATCH

TECHNICAL FIELD

The present disclosure relates to wrist watch products and parts thereof, and in particular to a wrist watch charging assembly and a wrist watch.

BACKGROUND

Along with the development of mobile technologies, mobile functions have been added to many conventional electronic products. For example, watches that could only be used to tell time in the past can now have multiple functions through a built-in smart system or carrying a smart phone system to access the Internet, and can synchronize phone calls, text messages, emails, photos and music in a cell phone.

At present, most smart watches on the market are charged in a way that is not quite different from those for smart phones, all of which perform charging by connecting to a computer or a charger with a USB data cord, there is no great improvement, and it is very inconvenient as they are excessively dependent on a data cord.

SUMMARY

In light of the drawbacks of the prior art, a wrist watch charging assembly is provided that charges conveniently and has a novel structure, and a wrist watch is also provided that integrates the watch charging assembly.

To attain the above object, the following technical solutions are provided:

In an embodiment, a wrist watch charging assembly is provided, comprising: a charging cord, a charging port connector and a charging head that are electrically connected to two ends of the charging cord, and a mobile pin electrically connected to a circuit board inside a watch case, wherein the charging cord is fixed relative to a watch band of the watch case, and wherein the charging head is attached onto the watch case by magnetic adhesion to be in electrical contact with the mobile pin.

In a further embodiment, the charging cord and the watch band are integrally injection-molded, and one end of the charging head is provided with an extension portion extending out of the watch band.

In yet a further embodiment, an end of an inner side of the watch band that is closest to the charging head is formed with a holding groove, and wherein the charging head is disposable into the holding groove.

In yet a further embodiment, a free end of the watch band is integrally connected with a charging port cap for holding the charging port connector, and wherein the charging port cap is rotatably disposed relative to a main part of the watch band.

In yet a further embodiment, a free end of the watch band is pivotally connected with a charging port cap for holding the charging port connector.

In yet a further embodiment, a magnet is provided on the watch case at a position close to the watch band, and the charging head comprises a metal part for engagement with the magnet and a contact for contacting the mobile pin.

In yet a further embodiment, the magnet comprises two pieces and the mobile pin is disposed between the two pieces.

In an embodiment, a wrist watch is provided, comprising a watch case, a circuit board, a watch band, a watch cover, and the above wrist watch charging assembly.

In a further embodiment, the watch band is rotatably connected to the watch case.

The present invention integrates a wrist watch charging assembly into the watch band of a wrist watch, enabling a user to conveniently perform charging by inserting a charging port connector into an external power source without using an external data cord. Such a charging manner has a novel design and is very practical. To provide a compact wrist watch form factor, an end of a charging head for connecting the mobile pin is optionally snapped into a holding groove on the watch band, and the charging port connector is optionally snapped into a charging port cap on the watch band.

DETAILED DESCRIPTION

To make the object, technical solution and advantages of the present invention clearer, the present invention is further described in detail below with reference to the accompanying figures and exemplary embodiments. It should be understood that the specific examples described herein are for illustrative purposes only. The exemplary embodiments are not intended to limit the scope of the claimed invention in any way.

Figure 1:
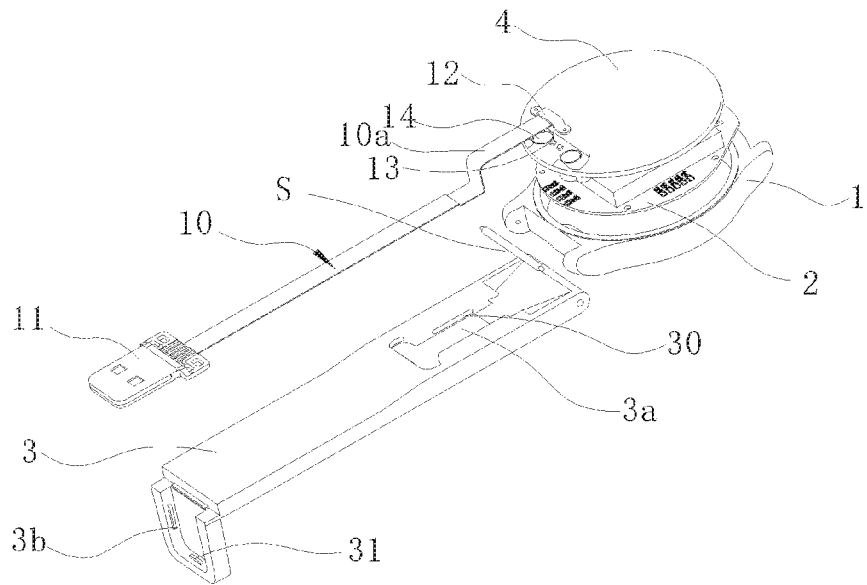
FIG. 1 depicts an exploded view of a structure of a wrist watch according to an exemplary embodiment of the present invention.

Referring to FIG. 1, a wrist watch according to the present invention comprises a watch case 1, a circuit board 2, a watch band 3, and a watch cover 4, the watch band 3 being rotatably connected to the watch case 1 through a spring bar S. Wherein, the charging of the wrist watch in an embodiment of the present invention is completed mainly through a wrist watch assembly, the wrist watch assembly comprises a charging cord 10, a charging port connector 11 and a charging head 12 that are electrically connected to two ends of the charging cord 10, and a mobile pin 13 electrically connected to a circuit board 2 inside the watch case 1, the mobile pin 13 may be disposed by running through one side of the watch cover 4 that is close to the spring bar S, the charging cord 10 is formed through injection molding inside the watch band 3, and the charging head 12 is attached onto the watch cover 4 by means of magnetic adhesion to be in electrical contact with the mobile pin 13.

In an example, a magnet 14 is provided on the watch cover 4 at a position close to the watch band 3, and the charging head 12 comprises a metal part for engagement with the magnet 14 and a contact for contacting the mobile pin 13. There are two magnets 14 in the present embodiment, the mobile pin 13 is disposed between the two magnets 14, for being in electrical contact with the metal contact on the charging head 12. The pin 13 is a commonly used metal elastic conductive needle, and the engagement between the magnets 14 and the pin 13 reliably turns on the charging circuit.

Figure 2:
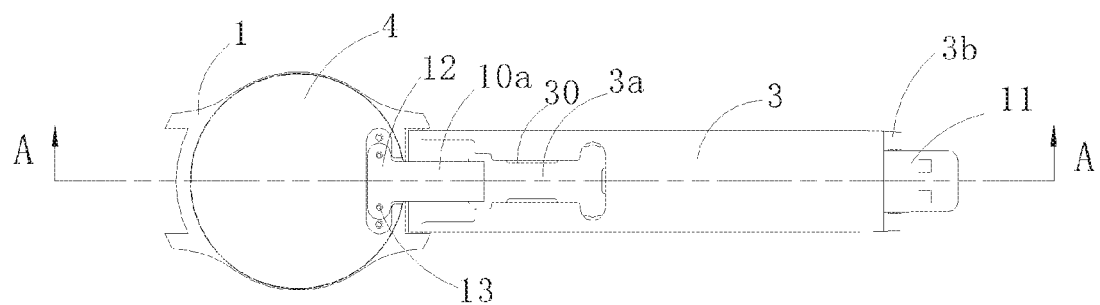
FIG. 2 depicts a schematic diagram of a structure of a wrist watch in a charging state according to an exemplary embodiment of the present invention.
Figure 3:
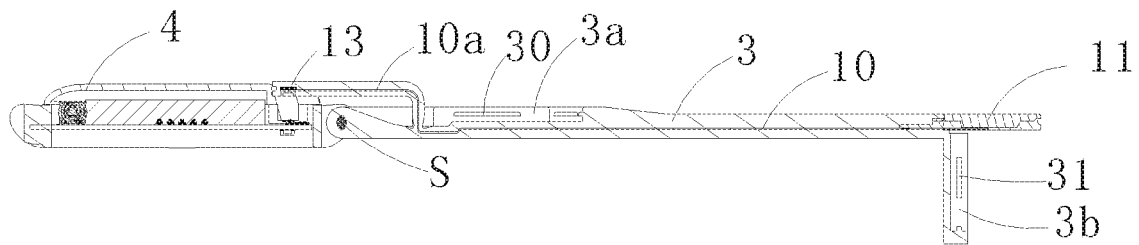
FIG. 3 depicts a cross-sectional view along A-A in FIG. 2.

Referring to FIG. 2 and FIG. 3, the charging cord 10 is encapsulated in the watch band 3, and one end of the charging head 12 is provided with an extension portion 10a extending out of the watch band 3, the watch band 3 is preferably made of a soft plastic material, such as TPU (Thermoplastic Polyurethanes), the surface of the extension portion 10a is also encapsulated by the watch band material, which has good flexibility.

The end of the inner side of the watch band 3 that is close to the charging head 12 may be formed with a holding groove 3a, and the charging head 12 and the extension portion 10a are optionally snapped or disposed into the holding groove 3a. Meanwhile, the free end of the watch band 3 is integrally connected with a charging port cap 3b for holding the charging port 11 for external connection, and the charging port cap 3b is rotatably disposed relative to the main part of the watch band 3.

Figure 4:
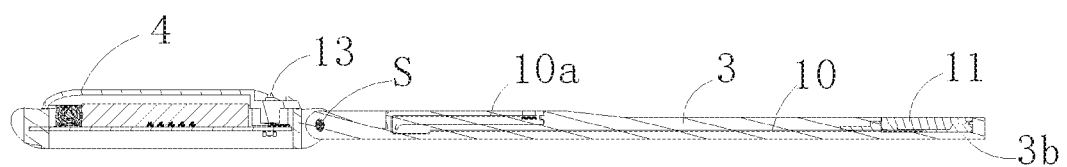
FIG. 4 depicts a cross-sectional view of a wrist watch in a non-charging state according to an exemplary embodiment of the present invention.

As shown in FIG. 3, when charging is needed, the extension portion 10a is taken out of the holding groove 3a, the extension portion 10a is folded toward the side of the watch cover 4, and the contact is precisely and reliably positioned through the adhesion of the charging head 12 to the two magnets 14 on the watch cover 4; meanwhile, the charging port cap 3b is flipped to expose the USB-type charging port connector 11 for external connection, which can then be inserted into a computer, a charging seat, a mobile power source or any other power source for charging. As shown in FIG. 4, when charging is completed or not needed, the extension portion 10a is folded to be retrieved and snapped into the holding groove 3a, the charging port cap 3b is flipped such that the charging port 11 for external connection is snapped and held therein, and the charging port cap 3b is on the same line as the watch band 3.

In other embodiments, the charging port cap 3b may be formed not integrally with the watch band 3, but can be a structure that is separately set up and pivotally connected with the free end of the watch band 3, which can achieve the same effect.

To improve the snap connection of the extension portion 10a, the charging head 12, and the charging port 11 for external connection with the watch band 3, corresponding inner walls of the holding groove 3a of the watch band 3 and the charging port cap 3b may be provided with a plurality of bumps 30, 31, in such a way that, when charging is not needed, the extension portion 10a, the charging head 12, and the charging port 11 for external connection can be better snapped onto the watch band 3.

With a wrist watch charging assembly integrated into the watch band of a wrist watch, a user can conveniently perform charging by inserting an integrated charging port connector into an external power source, leading to very convenient use since an external data cord is not required. Such a charging manner has a novel design and is very practical. To provide a compact wrist watch form factor, the end of the charging head for connecting the mobile pin is optionally snapped into a holding groove on the watch band, and the charging port for external connection is optionally snapped into a charging port cap on the watch band.

Only specific embodiments of the present invention are described above. It should be noted that those skilled in the art may make a number of improvements and modifications without departing from the principle of the present invention, and these improvements and modifications shall be encompassed by the present invention, as described in the appended claims.

The invention claimed is:

1. A charging assembly for a wrist watch, the charging assembly comprising:
    a charging cord encapsulated in a watch band configured to connect to a watch case of the wrist watch;
    a charging port connector electrically connected to a first end of the charging cord;
    a charging head electrically connected to a second end of the charging cord by an extension portion, the charging head and the extension portion being removably retained in a groove formed in the watch band when the charging head is not in use, and the charging head and the extension portion being located in a charging position exterior of the groove when charging the wrist watch, wherein, when the charging head is in the charging position, the charging head is configured to secure to a watch cover of the wrist watch by at least one magnet attached to the watch cover, the watch cover attaching to the watch case; and
    a mobile pin electrically connected to a circuit board inside the watch case, the mobile pin being in electrical connection with the charging head when the charging head is in the charging position.

2. The wrist watch charging assembly of claim 1, wherein the charging cord and the watch band are integrally injection-molded.

3. The wrist watch charging assembly of claim 1, wherein a free end of the watch band is integrally connected with a charging port cap for holding the charging port connector, and wherein the charging port cap is rotatably disposed relative to a main part of the watch band.

4. The wrist watch charging assembly of claim 3, wherein a magnet is provided on the watch case at a position close to the watch band, and wherein the charging head comprises a metal part for engagement with the magnet and a contact for contacting the mobile pin.

5. The wrist watch charging assembly of claim 1, wherein a free end of the watch band is pivotally connected with a charging port cap for holding the charging port connector.

6. The wrist watch charging assembly of claim 1, wherein the at least one magnet is provided on the watch cover at a position close to the watch band, and the charging head comprises a metal part for engagement with the at least one magnet and a contact for contacting the mobile pin.

7. The wrist watch charging assembly of claim 6, wherein the at least one magnet comprises two magnets and the mobile pin is disposed between the two magnets.

8. The wrist watch charging assembly of claim 1, wherein the at least one magnet is provided on the watch case at a position close to the watch band, and wherein the charging head comprises a metal part for engagement with the at least one magnet and a contact for contacting the mobile pin.

9. A wrist watch, comprising:
    a watch case;
    a circuit board inside the watch case;
    a watch band connected to the watch case;
    a watch cover connected to the watch case; and
    a wrist watch charging assembly comprising:
        a charging cord encapsulated in a watch band of the wrist watch;
        a charging port connector electrically connected to a first end of the charging cord;
        a charging head electrically connected to a second end of the charging cord by an extension portion, the charging head and the extension portion being removably retained in a groove formed in the watch band when the charging head is not in use, and the charging head and the extension portion being located in a charging position exterior of the groove when charging the wrist watch, wherein, when the charging head is in the charging position, the charging head is secured to the watch cover by at least one magnet attached to the watch cover; and a mobile pin electrically connected to the circuit board, the mobile pin being in electrical connection with the charging head when the charging head is in the charging position.

10. The wrist watch of claim 9, wherein the watch band is rotatably connected to the watch case.

11. The wrist watch of claim 9, wherein the charging cord and the watch band are integrally injection-molded.

12. The wrist watch of claim 9, wherein a free end of the watch band is integrally connected with a charging port cap for holding the charging port connector, and wherein the charging port cap is rotatably disposed relative to a main part of the watch band.

13. The wrist watch of claim 9, wherein a free end of the watch band pivotally connected with a charging port cap for holding the charging port connector.

14. The wrist watch of claim 9, wherein the at least one magnet is provided on the watch cover at a position close to the watch band, and the charging head comprises a metal part for engagement with the at least one magnet and a contact for contacting the mobile pin.

15. The wrist watch of claim 14, wherein the at least one magnet comprises two magnets and the mobile pin is disposed between the two magnets.

16. A wrist watch comprising:
a watch case;
a circuit board inside the watch case;
a watch band connected to the watch case;
a watch cover connected to the watch case; and
a wrist watch charging assembly comprising:
  a charging cord encapsulated in a watch band of the wrist watch;
  a charging port connector electrically connected to a first end of the charging cord;
  a charging head electrically connected to a second end of the charging cord by an extension portion, the charging head and the extension portion being removably snap-fit into in a groove formed in the watch band when the charging head is not in use, and the charging head and the extension portion being located in a charging position exterior of the groove when charging the wrist watch, wherein, when the charging head is in the charging position, the charging head is secured to the watch cover by at least one magnet attached to the watch cover; and
a mobile pin electrically connected to the circuit board, the mobile pin being in electrical connection with the charging head when the charging head is in the charging position.

* * * * *